United States Patent Office 3,028,390
Patented Apr. 3, 1962

3,028,390
SUBSTITUTED PIPERAZINE COMPOUNDS AND PROCESS FOR PRODUCING THE SAME
Robert F. Parcell, St. Clair Shores, Mich., assignor to Parke, Davis & Company, Detroit, Mich., a corporation of Michigan
No Drawing. Filed Feb. 4, 1959, Ser. No. 791,020
4 Claims. (Cl. 260—268)

This invention relates to N-phenyl piperazine compounds and means for their production and particularly to N-phenyl piperazines having in free base form the general formula,

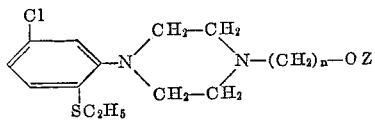

where $n$ is an integer from 3 to 6 and Z represents a hydrogen atom or a lower fatty acid acyl group such as acetyl, propionyl, etc. The compounds of the invention having the above formula possess basic properties and form acid salts upon reaction with inorganic and organic acids such as hydrochloric, hydrobromic, sulfuric, phosphoric, hydriodic, acetic, citric and like acids. The invention includes such compounds not only in free base form but also in the mentioned acid salt form.

The production of the compounds of the invention can be carried out in accordance with any of several embodiments. In one embodiment of the invention the N-phenyl piperazine compounds produced by reacting an N-phenyl piperazine compound which in free base form has the formula,

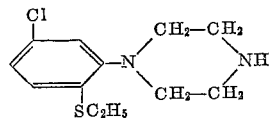

with a reactive derivative of an ω-hydroxy aliphatic compound or ω-acyloxy aliphatic compound containing from 3 to 6 carbon atoms in the aliphatic portion thereof, and if necessary reducing the reaction product. In one variation of this method an ω-alkanol halide, sulfate or sulfonate or an ω-acyloxyalkyl halide, sulfate or sulfonate can be employed as the reactive derivative. In carrying out this method it is preferable to employ about two equivalents of the N-phenyl piperazine for each equivalent of the reactive derivative. The reaction is conveniently carried out in the presence of an anhydrous organic solvent. Among the many solvents which are suitable for the purpose may be mentioned hydrocarbons such as benzene, toluene, xylene and the like; low boiling alcohols such as methanol, ethanol, isobutanol, isopropanol and the like; and low boiling ketones such as acetone, methyl ethyl ketone and the like. The temperature of the reaction is not particularly critical and can be varied widely. The range from room temperature to about 175° C. is preferred. For best results the reaction is carried out at the reflux temperature of the reaction mixture.

The reaction can also be carried out employing as the reactive derivative a lower alkyl ester of a 3- to 6-carbon ω-hydroxy straight chain aliphatic carboxylic acid or an ω-carbo (lower alkoxy) 3- to 6-carbon acyl halide. The reaction is carried out in the same manner indicated above and the reaction product is subsequently reduced. Reduction can be carried out in accordance with the invention in a number of different ways, preferably by catalytic means employing gaseous hydrogen and a metal catalyst such as copper chromite, or by chemical means employing metallic sodium and an alcohol or a complex oxidizable metal hydride such as lithium aluminum hydride. In carrying out the reduction with gaseous hydrogen a copper chromite catalyst is employed in the presence of an inert organic solvent, preferably at hydrogen pressure of about 200 to 300 atmospheres at a temperature in the range from about 200 to 300° C. Solvents which can be used for the reaction include lower aliphatic alcohols and cyclic aliphatic ethers. Some examples of these solvents are methanol, ethanol, n-propanol, isopropanol, dioxane and the like. Reduction with lithium aluminum hydride is accomplished in an anhydrous nonhydroxylic organic solvent. Some examples of suitable solvents are di-ethylether, di-isopropylether, dioxane, tetrahydrofuran, ethylene glycol dimethyl ether and ethylene glycol diethyl ether. Preferably, lithium aluminum hydride is employed in excess of the theoretical amount required. Best results are obtained by combining the reactants slowly. The temperature during the reduction is not particularly critical; the optimum temperature is in the range from about 15 to 35° C. Reduction with sodium metal in the presence of alcohol is accomplished preferably at the reflux temperature of the reaction mixture. Some examples of suitable alcohols are methanol, ethanol, n-propanol, isopropanol, n-butanol and the like. For best results sodium is employed in excess of the theoretical amount required.

The reaction can be carried out using allyl alcohol as the reactive derivative, in the presence of an alkali metal alcoholate of allyl alcohol. The temperature of the reaction is not critical and can be varied over a wide range. Temperatures in the range from 75 to 100° C. are preferred, particularly reflux temperature. For best results the reaction is carried out in the absence of any solvent other than allyl alcohol.

The reaction can also be carried out employing as a reactive derivative a lower alkyl ester of acrylic acid and subjecting the reaction product to reduction in the manner indicated above.

In accordance with a further embodiment of the invention the N-phenyl piperazine compounds containing an ω-hydroxyalkyl radical are converted to the corresponding alkanol esters by acylation. In carrying out the reaction an acylating agent such as an acyl halide or anhydride is employed in an inert anhydrous organic solvent such as an aliphatic ketone, aliphatic ether, benzene, toluene, dioxane and the like. In a case where acetic anhydride is employed as an acylating agent, acetic acid can be advantageously employed as the solvent. The temperature of the reaction is not particularly critical and can be varied over a considerable range. While temperatures in the range from 0 to 150° C. are ordinarily satisfactory, the reaction is preferably carried out at the reflux temperature of the reaction mixture. The relative quantities of the reactants can be varied within wide limits. However, for reasons of economy as well as ease of purification of the product, an excess of the acylating agent is generally employed.

The invention also contemplates the conversion by hydrolysis or alcoholysis of the compounds of the invention containing an ω-acyloxyalkyl radical to the corresponding ω-hydroxyalkyl compounds. Hydrolysis can be conveniently carried out with an aqueous alkali or alkaline earth metal hydroxide in an inert organic solvent such as a lower aliphatic alcohol or lower aliphatic ketone. Alcoholysis can be carried out with catalytic amounts of an alkali metal alcoholate in an anhydrous organic solvent such as a lower aliphatic alcohol. Alcoholysis or hydrolysis, as the case may be, can be effected over a wide temperature range but is preferably carried out at the boiling point of the reaction mixture.

As indicated above the products of the invention occur in both the free base and acid salt forms. In some instances it will be desirable to obtain the acid salt from the free base. In this case the salt can be prepared by reacting the free base with the corresponding acid in the presence of a suitable organic solvent in which the intended salt is insoluble, permitting isolation of the salt by filtration, or other suitable means. On the other hand in those instances where it is desired to convert the acid salt to the free base, the same can be accomplished by dissolving the salt in a suitable solvent such as water, methanol, etc., neutralizing the solution with a basic material such as sodium hydroxide, ammonium hydroxide, alkali metal carbonate and the like and isolating the desired base by extraction or other suitable means.

The products of the invention possess significant cerebral depressant activity; consequently, they have application, when administered orally in suitable dosage form, as tranquilizing agents. Further, the compounds possess anti-emetic properties and therefore are applicable as agents for the treatment of nausea, when used orally.

The invention is illustrated by the following examples.

*Example 1*

A mixture of 54 g. of 1-(5-chloro-2-ethylmercaptophenyl)-piperazine, 22 g. of 5-bromopentanol-1-acetate ester 250 ml. of benzene is stirred and allowed to reflux for sixteen hours. The reaction mixture is diluted to one liter with ether, stirred and filtered. The solvent is taken off by evaporation and the residue is taken up in 500 ml. of methanol. Sodium methoxide (2 g.) is added and the methanol is removed by evaporation. The residue is diluted to 500 ml. with ether, washed three times with 200 ml. of water, dried over magnesium sulfate, and the ether is removed by distillation. The residual product, 4 - (5 - chloro-2-ethylmercaptophenyl)-1-piperazinepentanol, is converted to the monohydrochloride with an equivalent amount of isopropanolic hydrogen chloride. Ether is added and the product which separates, 4-(5-chloro - 2 - ethylmercaptophenyl) - 1 - piperazinepentanol monohydrochloride, is removed and recrystallized from a mixture of isopropanol and ether; M.P. 164–165° C.

The starting material for the above-described process is a novel material and can be prepared from known substances by the following procedure: A mixture of 209 g. of 5-chloro-2-ethylmercaptoaniline, 174 g. of bis-(2-bromoethyl)amine hydrobromide and one liter of the butanol is stirred and refluxed for sixteen hours. An excess of aqueous sodium hydroxide solution is added, and the butanol is removed by steam distillation. The residue is cooled and extracted with ether. The ether layer is washed with two portions of 300 ml. of water and then extracted with 800 ml. of water containing 52 ml. of concentrated hydrochloric acid. The aqueous layer is separated, made basic and extracted with ether. The extract is washed with water and with 40% sodium hydroxide solution and then dried. The dry extract is distilled under reduced pressure. The fraction boiling at 140–180° C. (0.5 mm.) is collected and redistilled. The product, 1-(5-chloro-2-ethylmercaptophenyl)-piperazine, is collected as the fraction boiling at 145–149° C. (0.25 mm.).

*Example 2*

A mixture of 44.9 g. of 1-(5-chloro-2-ethylmercaptophenyl)-piperazine and 19 g. of methyl acrylate is allowed to stand for sixteen hours at room temperature. The reaction mixture is diluted to 200 ml. with ether and slowly added to a slurry of 7.6 g. of lithium aluminum hydride in 600 ml. of ether. The mixture is stirred fifteen minutes after the final addition and decomposed with 8 ml. of water, 6 ml. of 20% sodium hydroxide and finally with 28 ml. of water. The reaction mixture is filtered and evaporated on a steam bath. The residue and filter cake are combined and extracted twice with boiling benzene. The benzene extracts are combined and evaporated to dryness. The residue is triturated with petroleum ether and filtered to give 4-(5-chloro-2-ethylmercaptophenyl)-1-piperazinepropanol.

*Example 3*

5-carbomethoxyvalerylchloride (17.9 g.) is added to a solution of 44.9 g. of 1-(5-chloro-2-ethylmercaptophenyl)-piperazine and 500 ml. of benzene. The mixture is stirred for one-half hour, filtered and the filtrate is concentrated to about 75 ml. and diluted with 300 ml. of anhydrous ether. The solution, containing 4-(5-chloro-2-ethylmercaptophenyl) - 1 - delta - carbomethoxyvalerylpiperazine, is slowly added to a stirred solution of 7 g. of lithium aluminum chloride and 500 ml. of anhydrous ether. When the reduction is complete, an excess of aqueous alkali is added cautiously. The ethereal layer is removed, dried over anhydrous potassium carbonate and filtered. The solvents are removed from the filtrate by evaporation under reduced pressure; the residual product is 4-(5-chloro-2-ethylmercaptophenyl)-1-piperazinehexanol.

*Example 4*

A mixture of 44.9 g. of 1-(5-chloro-2-ethylmercaptophenyl)-piperazine, 19.5 g. of ethyl γ-bromobutyrate and 200 ml. of benzene is stirred at reflux temperature for twelve hours. The reaction mixture is cooled, filtered and the solvent removed from the filtrate by distillation. The residue is distilled under reduced pressure to yield ethyl 4-(5-chloro-2-ethyl-mercaptophenyl)-1-piperazinebutyrate which is then dissolved in anhydrous ether and added with stirring to 4 g. of lithium aluminum hydride dissolved in 500 ml. of anhydrous ether. When reduction is complete, an excess of aqueous alkali is added and the ethereal solution is decanted and dried with anhydrous potassium carbonate. The drying agent is removed by filtration and the ether is removed from the filtrate by evaporation on a steam bath. The residual product is 4-(5-chloro-2-ethylmercaptophenyl)-1-piperazinebutanol.

This application is a continuation-in-part of my co-pending application Serial No. 617,255 filed October 22, 1956, now abandoned.

I claim:

1. A member of the class consisting of N-phenylpiperazines and acid salts thereof having in free base form the formula

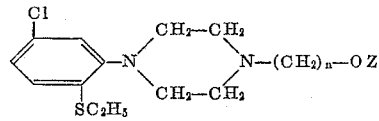

where $n$ is an integer from 3 to 6 and Z is a member of the class consisting of hydrogen and lower saturated aliphatic carboxylic acyl radicals.

2. 4 - (5 - chloro-2-ethylmercaptophenyl)-1-piperazinepentanol.

3. The compound of claim 2 in acid addition salt form.

4. A hydrochloric acid addition salt of 4-(5-chloro-2-ethylmercaptophenyl)-1-piperazinepentanol.

References Cited in the file of this patent

UNITED STATES PATENTS

| | | |
|---|---|---|
| 2,836,594 | Parcell | May 27, 1958 |
| 2,836,595 | Parcell | May 27, 1958 |